United States Patent

[11] 3,616,247

| [72] | Inventors | Harold George Hemming<br>Manchester;<br>Malcolm Lehan, Sandbach; David Giles, deceased, late of Alderley Edge; Anne Sylvia Giles, sole administrator, Newbury, all of England |
|---|---|---|
| [21] | Appl. No. | 773,981 |
| [22] | Filed | Nov. 4, 1968 |
| [45] | Patented | Oct. 26, 1971 |
| [73] | Assignee | Imperial Chemical Industries Limited<br>London, England |
| [32] | Priority | Dec. 13, 1967 |
| [33] | | Great Britain |
| [31] | | 56,618/67 |

[54] PRODUCTION OF GRISEOFULVIN
3 Claims, No Drawings

[52] U.S. Cl. .................................................. 195/81
[51] Int. Cl. ..................................................... C12d 9/00
[50] Field of Search ........................................ 195/81, 36 R, 80

[56] References Cited
UNITED STATES PATENTS
2,843,527   7/1958   Rhodes ........................ 195/81

OTHER REFERENCES
Furuya et al., Chemical Abstracts, Vol. 68, Apr. 22, 1968, p. 76909C

*Primary Examiner*—Joseph M. Golian
*Attorney*—Cushman, Darby & Cushman

ABSTRACT: A process for the manufacture of griseofulvin, a known antifungal agent, by fermentation of *Khuskia oryzae* and related organisms.

1

PRODUCTION OF GRISEOFULVIN

This invention relates to a manufacturing process, and more particularly it relates to a process for the manufacture of the compound griseofulvin which is known to be a valuable antifungal agent.

Griseofulvin has previously been manufactured by the fermentation of various species of micro-organisms of the genus Penicillium, for example members of the *P. urticae* group, for example *P. patulum* and *P. griseofulvum*, and also members of the *P. nigricans* group, for example *P. janczewski, P. kapuscinskii, P. albidum* and *P. raciborskii*, followed by extraction of the griseofulvin from the resulting fermentation broth.

We have now found that griseofulvin is produced by the fermentation of a suitable strain of *Khuskiaoryzae* or *Nigrospora oryzae* and related organisms. *Khuskia oryzae* sp. nov. is the perfect stage of *Nigrospora oryzae* (Berk. et Br.) Petch, and is fully described by H. J. Hudson in The Transactions of the British Mycological Society Volume 46, Number 3, pages 355–360 (1963). The genus Khuskia belongs to the order Sphaeriales of the class Ascomycetes, and the Penicillium genus, which includes the organisms known to produce griseofulvin, belongs to the order Moniliales of the class Fungi Imperfecti. Accordingly, *Khuskia oryzae* and its imperfect stage, *Nigrospora oryzae*, are not related to the organisms of the Penicillium genus, and it is therefore surprising that griseofulvin is produced by fermentation of *Khuskia oryzae* or *Nigrospora oryzae*. The genus Nigrospora contains several species which apparently differ from *Nigrospora oryzae* only in spore size, and these species, *N. sphaerica, N. sacchari* and *N. musae*, are described by Mason in The Transactions of the British Mycological Society, vol. 12, pgs. 152–165 (1927). We have also found that certain strains of these organisms are also capable of producing griseofulvin.

According to the invention, we provide a process for the manufacture of griseofulvin which comprises the fermentation of a griseofulvin-producing strain of *Khuskia oryzae, Nigrospora oryzae, Nigrospora sphaerica, Nigrospora sacchari* or *Nigrospora musae*, or a mutant thereof, with an aqueous nutrient medium, followed by isolation of griseofulvin from the resulting fermentation broth.

Suitable strains of organism which may be used in the above process are the strains identified as *Khuskia oryzae* [A.C.C. 3026; I.M.I. 122490] available from the Commonwealth Mycological Institute, Kew, England, and *Nigrospora oryzae* [A.C.C. 3145] and *Nigrosporo sacchari* [A.C.C.3143] both of which are available from the Centraalbureau voor schimmelcultures, Baarn, Netherlands. Of these, the preferred organism is *Khuskia oryzae* [A.C.C. 3026; I.M.I. 122490].

The fermentation may be carried out under still culture or shake culture conditions, where the organism is grown on the surface of the nutrient medium, or it may be carried out under submerged, stirred, aerated culture conditions, where the organism is grown in the body of the nutrient medium. The fermentation may be carried out at a temperature from 15° C. to 30° C., preferably at about 24° C. The fermentation is conducted for a sufficient time to enable the griseofulvin to be produced by the organism, and this time may vary between 2 days and 25 days depending upon the organism, the aqueous nutrient medium and the culture conditions employed.

The aqueous nutrient medium should contain sources of assimilable carbon and assimilable nitrogen. Suitable sources of assimilable carbon are, for example, carbohydrates, for example glucose, or hydroxy acids, for example tartaric acid. Suitable sources of assimilable nitrogen are, for example, inorganic salts, for example nitrates or ammonium salts, or organic nitrogen-containing compounds, for example those present in yeast extract. The aqueous nutrient medium should also contain sources of phosphorus, magnesium, sulfur and potassium, as well as minute quantities of trace elements such as iron, manganese, zinc, copper and molybdenum, which may be provided in the conventional forms. Examples of suitable aqueous nutrient media are:

a. Raulin–Thom medium containing (as percentage w/v). glucose 5%, tartaric acid 0.266%, ammonium tartrate 0.266%, ammonium sulfate 0.017%, ammonium hydrogen phosphate 0.04%, potassium carbonate 0.04%, and magnesium carbonate 0.027 %, together with iron 200 µg./l., manganese 24 µg./l., zinc 225 µg./l., copper 38 µg./l., and molybdenum 40 µg./l. and yeast extract 1 g./l.

b. Czapek–Dox medium containing (as percentage w/v), glucose 5%, sodium nitrate 0.2%, potassium dihydrogen phosphate 0.1%, magnesium sulfate $7H_2O$ 0.05% and potassium chloride 0.05%, together with iron 200 µg./l., manganese 24 µg./l., zinc 225 µg./l., copper 38 µg./l. and molybdenum 40 µg./l., and yeast extract 1 g./l.

c. A medium containing (as percentage w/v) sucrose 6%, corn steep liquor solids 0.175%, chalk 0.4%, potassium dihydrogen phosphate 0.4% and potassium chloride 0.2%.

The pH of the aqueous medium should be between 5.5 and 6.5 at the beginning of the fermentation.

The griseofulvin produced by fermentation of an organism as specified in the process of the invention, may be isolated from the fermentation broth by the well-known methods for the isolation of griseofulvin. Thus, for example, the fermentation broth may be filtered to separate the solid mycelium from the aqueous fermentation medium, and the griseofulvin may be isolated from the mycelium or the fermentation medium, or both, by extraction with an organic solvent, for example chloroform, followed by recovery of the griseofulvin from the extract.

The invention is illustrated but not limited by the following examples:

EXAMPLE 1

The pH of 1 litre of Czapek-Dox medium was adjusted to about 6.0, and the medium dispensed in 30 ml. portions into individual fermentation vessels. These vessels together with their contents were then autoclaved 200 20 minutes at a temperature of 120° C. under a pressure of 15 p.s.i., p.s.i., and then cooled. The medium in each vessel was then inoculated with a mycelial suspension of *Khuskia oryzae* (A.C.C. 3026; I.M.I. 122,490) obtained from a fresh slope on Raper steep agar (Czapek-Dox medium + corn steep + 1.5 percent agar), and fermented for 14 days at 24° C. under still culture conditions. The contents of the fermentation vessels were then combined, and the fermentation broth so obtained was filtered to separate the mycelium (solid) from the fermentation medium (filtrate).

The fermentation medium was extracted once with 200ml. of chloroform, and twice with 100 ml. of chloroform. The extracts were combined, washed with saturated sodium chloride solution, dried and evaporated. The residue was recrystallized from methanol to give 130 mg. of pure griseofulvin, m.p. 218–221° C., which showed no depression on admixture with an authentic sample of griseofulvin, and whose I.R. spectrum was identical with that of an authentic sample of griseofulvin.

The mycelium, retained above, was dried in a vacuum oven at 40° C., crushed and then extracted continuously with 500ml. of chloroform for 2 hours. The extract was evaporated to give a red solid (320 mg.) which was shown by U.V. estimation to contain griseofulvin to the extent of 90 percent.

EXAMPLE 2

One litre of Czapek-Dox medium at pH 5.6 was dispensed in 200 ml. portions into 5 individual 500 ml. vessels, and the vessels together with their contents autoclaved at a temperature of 120° C. under a pressure of 15 p.s.i. for 20 minutes. The vessels were then cooled, and the medium in each vessel was inoculated with a mycelial suspension of *Khuskia oryzae* (A.C.C. 3026; I.M.I. 122,490) from a fresh slope on Raper steep agar (Czapek-Dox + corn steep + 1.5 percent agar). The media were then incubated on a rotary shaker for 170 hours at 24° C. The contents of each of the vessels were combined, and the griseofulvin was extracted from the resulting fermentation broth by the procedure set out in example 1.

A yield of 40 mg. of griseofulvin was obtained from the fermentation medium, and a yield of 38 mg. was obtained from the mycelium.

What we claim is:

1. A process for the manufacture of griseofulvin which comprises the fermentation of a griseofulvin-producing strain of *Khuskia oryzae*, *Nigrospora oryzae*, *Nigrospora sphaerica*, *Nigrospora sacchari* or *Nigrospora musae*, or mutant thereof, with an aqueous nutrient medium, followed by the isolation of griseofulvin from the resulting fermentation broth.

2. A process as claimed in claim 1, wherein the griseofulvin-producing strain of *Khuskia oryzae* is that identified as I.M.I. 122490.

3. A process as claimed in claim 1 wherein the fermentation is carried out under culture conditions where the organism is grown on the surface of the nutrient medium and a temperature from 15° C. to 30° C.

* * * * *